US006555628B2

(12) United States Patent
Gan et al.

(10) Patent No.: US 6,555,628 B2
(45) Date of Patent: Apr. 29, 2003

(54) EPOXY RESINS AND PROCESS FOR MAKING THE SAME

(75) Inventors: Joseph Gan, Strasbourg (FR); Emile C. Trottier, Renchen (DE)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/007,518

(22) Filed: Dec. 5, 2001

(65) Prior Publication Data

US 2002/0128428 A1 Sep. 12, 2002

Related U.S. Application Data

(60) Provisional application No. 60/255,649, filed on Dec. 14, 2000.

(51) Int. Cl.$^7$ .......................... C08G 59/15; C08L 63/02
(52) U.S. Cl. .................... 525/523; 525/533; 528/89; 528/93; 528/112; 528/119
(58) Field of Search .................. 525/523, 533; 528/89, 93, 112, 119

(56) References Cited

U.S. PATENT DOCUMENTS

| 3,395,118 A | 7/1968 | Reinking et al. |
|---|---|---|
| 4,438,254 A | 3/1984 | Doorakian et al. |
| 4,480,082 A | 10/1984 | McLean et al. |
| 4,722,981 A | 2/1988 | Koenig et al. |
| 4,981,926 A | 1/1991 | Pham et al. |
| 5,089,588 A | 2/1992 | White et al. |
| 5,109,099 A | 4/1992 | Pham et al. |
| 5,115,075 A | 5/1992 | Brennan et al. |
| 5,171,820 A | 12/1992 | Mang et al. |
| 5,208,317 A | 5/1993 | Pham et al. |
| 5,246,751 A | 9/1993 | White et al. |

FOREIGN PATENT DOCUMENTS

EP 0 193 809 11/1990

OTHER PUBLICATIONS

U.S. application Ser. No. 60/255,649, filed Dec. 14, 2000; "Epoxy Resins and Process for Making the Same".
U.S. application Ser. No. 08/875,969, filed Feb. 10, 1995; "Epoxy Resin Composition Capable of Cure at Low Temperature".
U.S. application Ser. No. 60/213,965, filed Jun. 23, 2000; "Epoxy Resins and Process for Making the Same".

*Primary Examiner*—Margaret G. Moore
*Assistant Examiner*—D. Aylward
(74) *Attorney, Agent, or Firm*—Nemia C. Damocles

(57) ABSTRACT

A controlled conversion resin having an epoxy functionality of greater than 2 and comprising moieties derived from epoxy resin, dihydric phenol, acid anhydride, or amine. The resin is prepared by reacting an epoxy resin with a dihydric phenol, an acid anhydride, or amine or other branching agent in the presence of a catalyst and terminating the reaction at a point such that the reaction product contains both epoxy and terminal hydroxyl groups.

32 Claims, No Drawings

EPOXY RESINS AND PROCESS FOR MAKING THE SAME

This application claims the benefit of U.S. Provisional Application No. 60/255,649, filed Dec. 14, 2000.

BACKGROUND OF THE INVENTION

This invention relates to controlled conversion epoxy resins, hereinafter referred to as CCR resins, to a process for preparing said resins and to compositions containing these resins.

High molecular weight epoxy resins are generally prepared by a two-step process wherein a lower molecular weight epoxy resin is prepared initially by reacting a polyhydric phenol with epichlorohydrin and alkali metal hydroxide in the presence of a catalyst. Thereafter, the initial polyepoxide reaction product is advanced by its reaction with additional amounts of polyhydric phenol to form the higher molecular weight material. In conventional techniques for preparing the epoxy resins, the reaction of the polyepoxide and polyhydric phenol is typically carried out to complete conversion such that the final, advanced epoxy resin, also known as fully advanced resin, contains relatively low amounts of residual phenolic hydroxyl groups. For example, epoxy resins having an EEW (epoxy equivalent weight) between about 500 and about 700 prepared from bisphenol A and the diglycidyl ether of bisphenol A typically contain less than about 800 parts per million of phenolic hydroxyl groups which represents more than about 98 percent conversion of the phenolic hydroxyl groups employed in preparing the epoxy resin. A higher molecular weight epoxy resin having an EEW from greater than about 2000 to about 4000 typically contains less than about 2500 ppm of phenolic OH groups which represents more than about 95 percent conversion of the phenolic hydroxyl groups. Any residual hydroxyl groups in the advanced resin have been stated to cause viscosity instability of the resulting resin mixture, particularly at elevated temperatures.

Controlled conversion epoxy resins (CCR resins) are known and are described, for example, in U.S. Pat. No. 4,722,981, incorporated herein by reference. As described in this patent, CCR resins have improved cure rate over standard fully advanced resins. The cure rate of CCR resins has been further improved by increasing its functionality through the addition of a multi-functional phenol epoxy novolac to the CCR resins as described in copending U.S. patent application Ser. No. 08/875,969, filed Feb. 10, 1995. Since multi-functional phenol epoxy novolac resins usually have a lower softening point than the CCR resins, addition of novolac resins to CCR resins tend to decrease the softening point of the CCR resins.

Copending U.S. patent application Ser. No. 60/213,965, filed Jun. 23, 2000, describes increasing the functionality of fully advanced resins by using acid anhydride as a branching agent. The resulting product has increased viscosity compared to the standard fully advanced resin and standard CCR resin.

It would be desirable to provide a process for preparing CCR resins with increased functionality, and thus, cure rate, without lowering its softening point or increasing its viscosity.

As used herein, the term "functionality" refers to the average number of epoxy groups per resin molecule.

SUMMARY OF THE INVENTION

In one aspect, the present invention is a controlled conversion epoxy resin (CCR resin) containing both epoxy and terminal hydroxyl groups and having an epoxy functionality of greater than 2 and comprising moieties derived from an epoxy resin and a dihydric phenolan acid anhydride, or an amine.

By the term "epoxy group" it is meant a radical of the following structural formula:

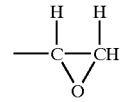

having an equivalent weight of 43 and by the term "terminal hydroxyl group" it is meant a terminal hydroxyl group having an equivalent weight of 17. For the purposes of this invention, the percent epoxy groups and the terminal phenolic hydroxyl groups in the CCR resin reaction product are determined by the methods described in U.S. Pat. No. 4,722,981, Footnotes 1 and 2, respectively, the descriptions incorporated herein by reference.

In a second aspect, the present invention is a process for preparing the CCR resin of the first aspect which comprises branching an epoxy resin by reacting a liquid epoxy resin and a dihydric phenol with an acid anhydride or an amine in the presence of a catalyst and terminating the reaction at a point such that the reaction product contains both epoxy and terminal hydroxyl groups, the acid anhydride being employed in an amount sufficient to achieve the desired epoxy functionality but insufficient to form gels in the anhydride-modified epoxy resin.

DETAILED DESCRIPTION OF THE INVENTION

The present reaction can be done in one step wherein a liquid epoxy resin (LER), anhydride, dihydric phenol and catalyst are reacted and the reaction terminated at a point such that the reaction product contains both epoxy and terminal hydroxyl groups.

Alternatively, the liquid epoxy resin and the dihydric phenol are reacted first and then the anhydride is added or, the LER and anhydride are reacted first, and then the dihydric phenol is added to the reaction and the reaction terminated at a point when the reaction product contains both epoxy and terminal hydroxyl groups.

The reaction can be done using a batch process or a continuous process conducted in a reactive extruder, such as that described in European Patent No. EP 0193809.

In preparing the CCR resins, the dihydric phenol, the acid anhydride and the epoxy resin components are contacted in the presence of a catalyst for the reaction between the hydroxyl groups of the dihydric phenol or the acid anhydride groups and the epoxy groups of the epoxy resin and at conditions sufficient to form the desired CCR resin. Preferably, this reaction is conducted neat, i.e., in the absence of any reaction diluent.

Although not preferred, the reaction of the dihydric phenol, acid anhydride and epoxy resin components can be conducted in the presence of a reaction diluent. If employed, the reaction diluent is preferably a solvent for or miscible with both the dihydric phenol, acid anhydride groups and the epoxy resin. Representative solvents which can be employed include various glycol ethers such as ethylene or propylene glycol monomethylether and esters thereof such as ethylene glycol monoethylether acetate; ketones such as methylisobutylketone, methylethylketone and acetone; and aromatic hydrocarbons such as toluene, xylene or mixtures thereof. If employed, the organic liquid reaction diluent is generally employed in an amount from about 5 to about 300 percent based on the total weight of all the reactants.

The reaction of the dihydric phenol and the epoxy resin, anhydride or amine is advantageously carried out at an elevated temperature, preferably, from about 60° C. to about 200° C., more preferably from about 100° C. to about 150° C. and, more preferably, from about 120° C. to about 140° C. The reaction is continued until the desired conversion, as determined by measuring the residual epoxy and terminal hydroxyl content in the resin, is achieved, at which point, the reaction is effectively terminated.

Any method which effectively inhibits the reaction upon reaching the desired degree of conversion can be employed herein. The reaction is effectively inhibited when the rate of reaction of the hydroxyl and epoxy group is sufficiently reduced such that further reaction, if any, does not significantly and deleteriously affect the product or its handling characteristics. Preferably, the reaction is sufficiently inhibited such that the solution viscosity of the CCR resin remains essentially constant or increases only marginally with time. For example, upon reaching the desired degree of conversion, the reaction mixture can be quenched to stop the reaction. However, the rapid quenching of the reaction mixture must be conducted carefully to prevent clotting or lumping of the CCR resin and to prevent the CCR resin from forming a large solid mass which cannot subsequently be used.

A convenient method for quenching the reaction mixture comprises the addition of a solvent to the mixture, thereby diluting the mixture and reducing its temperature. The amount of organic solvent to be added is dependent on the reaction temperature and the temperature at which reaction is effectively terminated. The addition of organic solvent to the reaction mixture is particularly preferred when the CCR resin is subsequently to be applied from solution.

A most preferred method for inhibiting the reaction comprises adding a material to the reaction mixture which effectively inhibits further reaction such as by deactivating the catalyst, or by interrupting the reaction mechanism, thereby inhibiting further reactions between the polyol and the polyepoxide.

Strong inorganic and organic acids and the anhydrides and esters of said acids (including half esters and part esters) have been found to be particularly effective as reaction inhibitors. By the term "strong acid" it is meant an organic acid having a $pK_a$ value below about 4, preferably below about 2.5. Representative reaction inhibitors include inorganic acids such as hydrochloric acid, sulfuric acid and phosphoric acid; inorganic acid anhydrides such as phosphoric acid anhydride; esters of inorganic acids such as dimethyl sulfate; the organic acids such as alkyl, aryl and aralkyl and substituted alkyl, aryl and aralkyl sulfonic acids such as p-toluene sulfonic acid and phenyl sulfonic acid and stronger organic carboxylic acids such as trichloroacetic acid and alkyl esters of said acids, such as the alkyl esters of p-toluene sulfonic acid, e.g., methyl-p-toluene sulfonate, and ethyl-p-toluenesulfonate, methanesulfonic acid methylester and mixtures thereof. An example of an acid anhydride of a strong organic acid that can be employed herein is p-toluene sulfonic acid anhydride. Of the reaction inhibitors, the alkyl esters of sulfuric acid: the aryl or aralkyl sulfonic acids and the alkyl esters of said acids are preferably employed herein. Most preferably, an alkyl ester of para-toluene sulfonic acid, particularly methyl or ethyl-p-toluene sulfonic acid is employed as the reaction inhibitor herein.

The amounts of reaction inhibitor added to the reaction mixture are dependent on the specific inhibitor employed and the catalyst employed in preparing the CCR resin. In general, the inhibitor is added in an amount sufficient to overcome the catalytic activity of the catalyst. Preferably, at least about 0.9, more preferably at least about 2, equivalents of the inhibitor are added for each equivalent of the catalyst employed. Although the maximum amount of inhibitor added to the reaction mixture is dependent on the desired properties of the resin and the expense of adding excess inhibitor, the inhibitor is preferably added in an amount not exceeding about 5 equivalents for each equivalent of catalyst in the reaction mixture.

The reaction is terminated at a point such that the resulting CCR resin contains the desired amounts of epoxy groups and terminal hydroxyl groups. In this invention, the CCR resin will contain at least about 0.25 percent, by weight, of each of the epoxy and terminal hydroxyl groups. The epoxy resins which can be employed in the practice of the present invention for preparing the CCR resins include the diglycidyl ethers of dihydric phenols, such as those described in U.S. Pat. Nos. 5,246,751; 5,115,075; 5,089,588; 4,480,082 and 4,438,254, all of which are incorporated herein by reference, or the diglycidyl esters of dicarboxylic acids such as those described in U.S. Pat. No. 5,171,820.

The diglycidyl ethers of dihydric phenols are preferably the diglycidyl ethers of resorcinol, hydroquinone, 4,4'-isopropylidene bisphenol (bisphenol A), 4,4'-dihydroxydiphenylethylmethane, 3,3'-dihydroxy-diphenyldiethylmethane, 3,4'-dihydroxydiphenyl-methylpropylmethane, 4,4'-dihydroxydiphenyloxide, 4,4'-dihydroxydiphenylcyanomethane, 4,4'-dihydroxy-biphenyl, 4,4'-dihydroxybenzophenone (bisphenol-K), 4,4'-dihydroxydiphenyl sulfide, 4,4'-dihydroxydiphenyl sulfone, 2,6-dihydroxynaphthalene, 1,4'-dihydroxy-naphthalene, catechol, 2,2-bis(4-hydroxyphenyl)-acetamide, 2,2-bis(4-hydroxyphenyl)ethanol, 2,2-bis(4-hydroxyphenyl)-N-methylacetamide, 2,2-bis(4-hydroxy-phenyl)-N,N-dimethylacetamide, 3,5-dihydroxyphenyl-acetamide, 2,4-dihydroxyphenyl-N-(hydroxyethyl)-acetamide, and other dihydric phenols listed in U.S. Pat. Nos. 3,395,118, 4,438,254 and 4,480,082 which are hereby incorporated by reference as well as mixtures of one or more of such diglycidyl ethers. Of these preferred diglycidyl ethers, those of bisphenol-A, hydroquinone, and resorcinol are more preferred, with the diglycidyl ether of bisphenol-A being most preferred.

The diglycidyl esters of dicarboxylic acids are preferably the diglycidyl esters of terephthalic acid, isophthalic acid, 2,6-naphthalenedicarboxylix acid, 3,4'-biphenyldicarboxylic acid, 4,4'-biphenyldicarboxylic acid, malonic acid, succinic acid, glutaric acid, adipic acid, pumelic acid, suberic acid, azaleic acid, sebasic acid, 1,4-cyclohexanedicarboxylic acid, 1,10-decanedicarboxylic acid, tartaric acid, malic acid, citramalic acid and hydroxyglutaric acid. The more preferred diglycidyl esters are the diglycidyl esters of terephthalic acid, isophthalic acid, adipic acid, 1,4-cyclohexanedicarboxylic acid and 1,10-decanedicarboxylic acid.

Other suitable epoxy resins include $\alpha$, $\omega$-diglycidyloxyisopropylidene-bisphenol-based epoxy resins (commercially known as D.E.R.™ 300 and 600 series epoxy resins), $\alpha$, $\omega$-diglycidyloxy tetrabromoisopropylidene-bisphenol-based phenoxy resins, such as D.E.R. 542, both are products of The Dow Chemical Company. Preferred epoxy resins are the epoxy resins having an epoxy equivalent weight of from about 100 to about 4000. Most preferred epoxy resins are the diglycidyl ethers of bisphenol A; bisphenol F; 4,4'-sulfonyldiphenol; 4,4-oxydiphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-alpha-methylstilbene and the diglycidyl esters of the dicarboxylic acids mentioned previously.

The amount of epoxy resins used depends on the targeted molecular weight and epoxy functionality. In general, the epoxy resin is used in an amount of from about 30 wt. % to about 85 wt. %, more preferably, from about 40 wt. % to about 75 wt. % and, most preferably, from about 45 wt. % to about 70 wt. %, based on the weight of reactants.

The anhydrides which can be employed in the practice of the present invention for preparing the anhydride-modified epoxy resin (epoxy-functional polyester/polyether oligomer or polymer) include diglycolic anhydride, dichloromaleic anhydride, maleic anhydride, succinic anhydride, glutaric anhydride, citraconic anhydride, itaconic anhydride, tetrabromophthalic anhydride, phthalic anhydride, tetrahydrophthalic anhydride, hexahydrophthalic anhydride, tetrachlorophthalic anhydride, 4-methylhexahydrophthalic anhydride, methyl-5-norbornene-2,3-dicarboxylic anhydride, 1,8-naphthalic anhydride, trimilletic anhydride, 1,2,4,5-benzenetetracarboxylic dianhydride and halogenated acid anhydride such as tetrabromophthalic anhydride.

Preferred anhydrides are phthalic anhydride, maleic anhydride, tetrahydrophthalic anhydride, 4-methylhexahydrophthalic anhydride, hexahydrophthalic anhydride, methyl-5-norbornene-2,3-dicarboxylic anhydride and succinic anhydride. Most preferred are phthalic anhydride, 4-methylhexahydrophthalic anhydride, tetrahydrophthalic anhydride, hexahydrophthalic anhydride succinic anhydride and mixtures thereof.

The amount of anhydride used depends on the molecular weight of the anhydride, the amount of branching desired in the CCR and the targeted equivalent weight of the CCR. In general, the anhydride is used in an amount of from about 0.1 wt. % to about 20 wt. %, preferably from about 1 wt. % to about 15 wt. % and, most preferably, from about 1 wt. % to about 10 wt. %, based on the amount of reactants used.

The dihydric phenols which can be employed in the practice of the present invention for preparing the CCR include 4,4'-isopropylidene bisphenol (bisphenol A), 4,4'-dihydroxydiphenylethylmethane, 3,3'-dihydroxydiphenyldiethylmethane, 3,4'-dihydroxydiphenylmethylpropylmethane, bisphenol, 4,4'-dihydroxydiphenyloxide, 4,4'-dihydroxydiphenylcyanomethane, 4,4'-dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene, 1,4'-dihydroxy-naphthalene, catechol, resorcinol, hydroquinone, halogenated bisphenol such as tetrabromobisphenol A and other dihydric phenols listed in U.S. Pat. Nos. 3,395,118; 4,438,254 and 4,480,082 which are hereby incorporated by reference. In addition, mixtures of different dihydric phenols can be employed. Of these other dihydric phenols, bisphenol A, hydroquinone and mixtures thereof are most preferred.

The amount of dihydric phenol used depends on the molecular weight of the phenol, the molecular weight of the epoxy, the molecular weight of the anhydride, as well as the target equivalent weight of the SER and level of branching. In general, the dihydric phenol is used in an amount of from about 1 wt. % to about 60 wt. %, more preferably, from about 5 wt. % to about 50 wt. % and, most preferably, from about 20 wt. % to about 45 wt. %, based on the weight of reactants.

Preferred catalysts are, but not limited to, phosphines, amines, quaternary ammonium and phosphonium salts, such as tetraethylammonium chloride, tetraethylammonium bromide, tetraethylammonium iodide, tetraethylammonium hydroxide, tetra(n-butyl)ammonium chloride, tetra(n-butyl) ammonium bromide, tetra(n-butyl)ammonium iodide, tetra (n-butyl)ammonium hydroxide, tetra (n-octyl) ammonium chloride, tetra(n-octyl) ammonium bromide, tetra(n-octyl) ammonium iodide, tetra(n-octyl)ammonium hydroxide, methyltris(n-octyl)ammonium chloride, bis (tetraphenylphosphoranylidene)ammonium chloride, ethyltri-p-tolylphosphonium acetate/acetic acid complex, ethyltriphenylphosphonium acetate/acetic acid complex or combinations thereof and the like as described in U.S. Pat. Nos. 5,208,317, 5,109,099 and 4,981,926. Most preferred catalysts include tetraethylammonium bromide, tetraethylammonium hydroxide, ethyltritolylphosphonium acetate and ethyltriphenylphosphonium acetate.

The amount of catalyst used depends on the molecular weight of the catalyst, the activity of the catalyst and the speed at which the polymerization is intended to proceed. In general, the catalyst is used in an amount of from 0 wt. % to about 1 wt. %, more preferably, from about 0.01 wt. % to about 0.5 wt. % and, most preferably, from about 0.1 wt. % to about 0.2 wt. %, based on the weight of reactants.

The temperature at which the reaction is most advantageously conducted depends on the specific compounds and catalyst employed. In general this temperature is from about 50° C. to about 200° C., more preferably from about 90° C. to about 1800° C. and, most preferably, from about 120° C. to about 150° C.

The CCR resin of the present invention can be cured with a variety of epoxy curing agents such as phenolics, amines, carboxylic acids, phenol formaldehyde resins, and anhydrides, as well as through the hydroxyl group or an epoxy group. The CCR resins of the present invention can be reacted with a hardener such as, for example, an amine-terminated polymer, a carboxy-terminated polymer, a phenol-terminated polymer, a multifunctional amine, carboxylic acid or phenol.

The CCR resins of the present invention can be used in a variety of industrial applications or other epoxy applications such as coatings, laminates and composites. Industrial coatings are surface protective coatings (paint coatings) applied to substrates and typically cured or crosslinked to form continuous films for decorative purposes as well as to protect the substrate. A protective coating ordinarily comprises an organic polymeric binder, pigments, and various paint additives, where the polymeric binder acts as a fluid vehicle for the pigments and imparts Theological properties to the fluid paint coating. Upon curing or crosslinking, the polymeric binder hardens and functions as a binder for the pigments and provides adhesion of the dried paint film to the substrate. The pigments may be organic or inorganic and functionally contribute to opacity and color in addition to durability and hardness. The manufacture of protective coatings involves the preparation of a polymeric binder, mixing of component materials, grinding of pigments in the polymeric binder, and thinning to commercial standards.

The polymeric binder can include a wide variety of other additives such as, for example, hardeners, dyes, pigments and flow modifiers, fire-retardants, self extinguishing agents, desiccants and all manner of additives which are used herein for their known purposes. Examples of fire retardants include: monoammonium phosphate, diamonium phosphate and aluminum trihydrate. These additives can be in the form of liquids or particles so long as the binder remains solid, has the desired particle size and impart no adverse effects to the binder.

Powder paints can be obtained which comprise the CCR resin of the present invention, and suitable pigments, catalysts and additives. These powder paints and coatings therefrom have a surprisingly good combination of highly prized properties. Depending on the choice and the amount of polymer, crosslinker, catalyst and other components one can obtain, for example good flow, good chemical resistance, high gloss, high scratch resistance, good mechanical properties, good outdoor durability and good color stability.

Water-dispersed coating compositions containing the CCR resin of the present invention are highly desirable for can and coil coating compositions.

The following examples are for illustrative purposes only and are not intended to limit the scope of this invention. Unless otherwise indicated, all parts and percentages are by weight

EXAMPLES

The following materials were used in the examples.

| | |
|---|---|
| D.E.R.™ 330 | A diglycidyl ether of bisphenol-A, having an epoxy equivalent weight (EEW) of 180, a product of The Dow Chemical Company. |
| Bisphenol A or BIS-A | 2,2-bis(-4-hydroxy phenyl)propane |
| DSA | Dodecenylsuccinic acid anhydride |
| MHHPA | Methylhexahydrophthalic Acid Anhydride |
| Catalyst A | Triphenylethylphosphonium acetate/acetic acid complex |
| 2-MI | 2-methylimidzole |
| MPTS | Methyl ester of p-toluene sulfonic acid |
| Benzoin | 2-hydroxy-2-phenyacetophenone |
| Powder III | Polyacrylate |
| VER | Epoxy Vinyl Ester Resin |

The Epoxy Vinyl Ester Resin (VER) used in Coating Formulation 4 was prepared by acrylation of liquid epoxy resin (D.E.R.™ 330) with acrylic acid at 120° C. using standard acrylation process. 2-methylimidazole (2-MI) was added to the VER and the mixture reacted (Michael adition reaction) at about 120° to 130° C. over a period of 90 minutes. The final reaction product was flaked as a solid.

Example 1

D.E.R. 330 (3137 g), Bis-A (1661.5 g)and MHHPA (200 g) were charged into a resin kettle equipped with a heating mantle. The components were mixed together and heated to 110° C. After the bisphenol-A dissolved in the D.E.R. 330, the mixture was cooled down to 100° C. Catalyst A (1.0 g) was added to the mixture which was then heated slowly to 140° C. by stages of 10° C. to avoid any exothermic reaction. The reaction mixture was held at 140° C. for 60 minutes and the first sample was taken. The melt viscosity measured at 150° C. using ICI cone and plate viscometer of the sample taken at this point was determined to be 0.02 Pa·s. The reaction mixture was then heated slowly to 150° C. A sample of the reaction mixture was taken and its melt viscosity was determined to be 0.04 Pa·s. The temperature of the reaction mixture was held at 150° C for approximately 40 minutes and a sample was taken. This sample had a melt viscosity at 150° C. of 0.86 Pa·s. The molten resin was poured on aluminum foil for cooling.

The resulting polymer had a $T_g$ of 56° C. ($T_{g1}$) and 50° C. ($T_{g2}$), % EP/EEW of 5.45%/789 and melt viscosity measured at 150° C. of 0.98 Pa·s.

Example 2

D.E.R.™ 330 (643.1 g), BIS-A (316.1 g) and DSA (61.3 g) were charged into a reactor. The mixture was heated to 90° C. Catalyst A (0.510 g) was added to the mixture. The temperature was increased slowly to 140° C. by stages of 10° C. to avoid any exothermic reaction. The temperature was kept at 140° C. Samples of the reaction mixture were taken for melt viscosity determination until the melt viscosity of the obtained resin reached 800 mPa·s. The resin was flaked as soon as the desired melt viscosity was reached.

The resulting product (resin flakes) had a melt viscosity at 150° C. of 0.80 Pa·s, $T_g$ of 45.9° C. ($T_{g1}$) and 42.9° C. ($T_{g2}$), %EP/EEW of 5.75%/789, and Mettler Softening Point (MSP) of 85° C.

Comparative Example A

The procedure of Example 1 was followed except that no acid anhydride, such as MHHPA, was used and MPTS was added to the reaction mixture when the melt viscosity of the resin at 150° C. reached 800 mPa·s. The resulting product (flaked resin) had a melt viscosity at 150° C. of 0.96 Pa·s, $T_{g1}$ of 53° C., $T_{g2}$ of 47° C., %EP/EEW of 5.24%/821 and MSP of 87.8° C.

Example 3

D.E.R. 330 (1330 g) and Bis-A (590 g) were charged into a glass reactor, heated to 100° C. and mixed for 20 minutes until homogenous. Sulfanilamide (80 g) was added to the mixture which was then heated to 110° C. Catalyst A (1 g) was added and the mixture heated slowly to 115° C. The reaction temperature was maintained at 115° C. for about 80 minutes. A sample was taken and its melt viscosity (measured at 150° C.) was determined to be 0.28 Pa·s. The reaction mixture was heated to 120° C. and kept at this temperature for 45 minutes. A sample of the reaction mixture was taken and its melt viscosity was determined to be 0.89 Pa·s. The molten resin was poured onto an aluminum foil for cooling.

The resulting polymer had a $T_g$ of 51° C. ($T_{g1}$) and 52° C ($T_{g2}$), % EP/EEW of 6.9%/623 and melt viscosity measured at 150° C. of 0.89 Pa·s.

Example 4

Powder Coating Preparation

The epoxy resins prepared in Examples 1, 2 and 3 and Comparative Example A were formulated into typical powder coating formulations by mixing the epoxy resin, imidazole type catalyst and other additives. The mixtures were extruded at 80° C. on a 30 mm twin screw extruder (300 rpm) and the extrudate was ground on a lab grinder to an average particle size of about 30 microns. The powders so produced were applied using an electrostatic pistol on to iron phosphated steel panels (Bonder panels, 100 mm ×130 mm) and cured at 120° C. for 20 minutes peak metal temperature. As used herein, the term "peak metal temperature" refers to the highest temperature that the panel attains in the oven (i.e., 20 minutes at 120° C. means about 27 minutes in a circulating oven set to 120° C.).

The coating formulations are shown in Table 1 and the performance data for these systems are shown in Table 2.

TABLE 1

Coating Formulations

| Resin Type | Raw Materials | Coating Formulation (g) | | | |
|---|---|---|---|---|---|
| | | 1 | 2 | 3 | 4 |
| Example 1 Resin | LER/BISA/4%-MHHPA | 679.6 | 655.5 | | |
| Example 2 Resin | capital letter | | | 676.2 | |
| Com. Example A Resin | cap. let | | | | 676.2 |
| 2-MI | 2-methylimidazole | 10.4 | | 13.8 | 13.8 |
| Example 3 Resin | Epoxy Vinyl Ester/2- MI adduct | | | | 34.5 |
| [1]KRONOS ™ 2310 | TiO$_2$ | 296 | 296 | 296 | 296 |
| Benzoin | 2-Hydroxy-2-phenyacetophenone | 4 | 4 | 4 | 4 |
| Powder III | Polyacrylate | 10 | 10 | 10 | 10 |
| Total | | 1000 | 1000 | 1000 | 1000 |

[1]A trademarked product of Kronos GmBH Company

TABLE 2

COATING PERFORMANCE

| Mechanical Properties | | | 1 | 2 | 3 | 4 |
|---|---|---|---|---|---|---|
| Gel Time (in seconds) at 140° C.[1] | Powder | sec | 81 | 134 | 73 | 64 |
| DSC[2] | Tg powder | ° C. | 57 | 56 | 54 | 56 |
| | Peak exotherm | ° C. | 135 | 143 | 131 | 130 |
| | Tg 2 | after exotherm/° C. | 102 | 101 | 99 | 101 |
| Flow[3] no unit | | 1 worse 4 best | 1.8 | 1.9 | 2 | 1.6 |
| Gloss[4] | 20/60° | Micro TRI Gloss | 84/101 | 91/101 | 83/99 | 84/101 |
| Adhesion[5] | Cross hatch | (CV lab; Gt0 best)[9] | Gt0 | Gt0 | Gt0 | Gt0 |
| Indentation[6] | mm | | 8.4 | 9.1 | 9 | 8.2 |
| Impact[7] | inches/lbs | front | 80 | 100 | 64 | 32 |
| | | reverse | 32 | 80 | 32 | 20(fail) |
| Chemical resistance[8] | | Acetone Double rubs | 100 | 100 | >100 | 40 |

[1]DIN 55990 part 8
[2]Mettler DSC Operational Manual
[3]Visual
[4]A.S.T.M. D-523-89 (re-approved 1994)
[5]A.S.T.M. D-3359-95
[6]DIN EN ISO1520 of April 1995
[7]A.S.T.M. D-2794-93
[8]Acetone Double Rubs - A small cotton wool pad is soaked with acetone, applied to the coating and rubbed back and forth over the same area with even pressure until the continuity of the coating is destroyed. The number of "double rubs" necessary for this is noted.
[9]Gt is the abbreviation for Gitterschnitt i.e. German for cross-hatch The data in Table 2 show that the coatings comprising the resins of the present invention have better mechanical properties (indentation, impact resistance and chemical resistance) than the epoxy resins not prepared in accordance with the present invention.

What is claimed is:

1. A controlled conversion epoxy resin or CCR resin containing both epoxy and terminal hydroxyl groups and having an epoxy functionality of greater than 2 comprising moieties derived from an epoxy resin and a dihydric phenol, an acid anhydride, or an amine.

2. The CCR resin of claim 1 wherein the epoxy resin is a diglycidyl ether of a dihydric phenol or a diglycidyl ester of a dicarboxylic acid.

3. The CCR resin of claim 2 wherein the diglycidyl ether is a diglycidyl ether of bisphenol-A, hydroquinone or resorcinol.

4. The CCR resin of claim 2 wherein the diglycidyl ester is a diglycidyl ester of terephthalic acid, isophthalic acid, adipic acid, 1,4-cyclohexane-dicarboxylic acid, and 1,10-decanedicarboxylic acid.

5. The CCR resin of claim 1 wherein the dihydric phenol is 4,4'-isopropylidene bisphenol, 4,4'-dihydroxydiphenylethylmethane, 3,3'-dihydroxy-diphenyldiethylmethane, 3,4'-dihydroxydiphenyl-methylpropylmethane, bisphenol, 4,4'-dihydroxydiphenyl-oxide, 4,4'-dihydroxydiphenylcyanomethane, 4,4'-dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene, 1,4'-dihydroxy-naphthalene, catechol, resorcinol, hydroquinone, or tetrabromobisphenol A.

6. The CCR resin of claim 1 wherein the acid anhydride is diglycolic anhydride, dichloromaleic anhydride, maleic anhydride, succinic anhydride, glutaric anhydride, citraconic anhydride, itaconic anhydride, tetrabromophthalic anhydride, phthalic anhydride, tetrahydrophthalic anhydride, hexahydrophthalic anhydride, tetrachlorophthalic anhydride, 4-methylhexahydrophthalic anhydride, methyl-5-norbornene-2,3-dicarboxylic anhydride, 1,8-naphthalic anhydride, trimilletic anhydride, 1,2,4,5-benzenetetracarboxylic dianhydride halogenated acid anhydride such as tetrabromophthalic anhydride.

7. A process for preparing a CCR resin having an epoxy functionality of greater than 2 comprising branching an epoxy resin by reacting a liquid epoxy resin and a dihydric phenol with an acid anhydride or an amine in the presence of a catalyst and terminating the reaction at a point such that the reaction product contains both epoxy and terminal hydroxyl groups, the acid anhydride being employed in an amount sufficient to achieve the desired epoxy functionality but insufficient to form gels in the anhydride-modified epoxy resin.

8. The process of claim 7 wherein the reaction of the dihydric phenol and the epoxy resin, anhydride or amine is conducted at a reaction temperature of from about 60° C. to about 200° C.

9. The process of claim 8 wherein the reaction temperature is from about 100° C. to about 150° C.

10. The process of claim 9 wherein the reaction temperature is from about 120° C. to about 140° C.

11. The process of claim 7 wherein the reaction is terminated by adding a solvent to the reaction mixture, thereby diluting the mixture and reducing its temperature.

12. The process of claim 7 wherein the reaction is terminated by deactivating the catalyst or by interrupting the reaction mechanism, thereby inhibiting further reactions between the polyol and the polyepoxide.

13. The process of claim 7 wherein the reaction is terminated by adding a reaction inhibitor to the reaction mixture.

14. The process of claim 13 wherein the reaction inhibitor is a strong inorganic acid or organic acid or the anhydrides or esters of said acids.

15. The process of claim 14 wherein the reaction inhibitor is hydrochloric acid, sulfuric acid, phosphoric acid, p-toluene sulfonic acid, phenyl sulfonic acid, trichloroacetic acid; phosphoric acid anhydride; dimethyl sulfate; methyl-p-toluene sulfonate, ethyl-p-toluene sulfonate, methanesulfonic acid methylester and mixtures thereof.

16. The process of claim 7 wherein the catalyst is a phosphine, an amine, a quaternary ammonium salt or a quaternary phosphonium salt.

17. The process of claim 16 wherein the catalyst is tetraethylammonium chloride, tetraethylammonium bromide, tetraethylammonium iodide, tetraethylammonium hydroxide, tetra(n-butyl)ammonium chloride, tetra(n-butyl) ammonium bromide, tetra(n-butyl)ammonium iodide, tetra (n-butyl)ammonium hydroxide, tetra (n-octyl) ammonium chloride, tetra (n-octyl) ammonium bromide, tetra(n-octyl) ammonium iodide, tetra(n-octyl)ammonium hydroxide, methyltris(n-octyl)ammonium chloride, bis (tetraphenylphosphoranylidene)ammonium chloride, ethyltri-p-tolylphosphonium acetate/acetic acid complex, ethyltriphenylphosphonium acetate/acetic acid complex or combinations thereof.

18. The process of claim 17 wherein the catalyst is tetraethylammonium bromide, tetraethylammonium hydroxide, ethyltritolylphosphonium acetate or ethyltriphenylphosphonium acetate.

19. The process of claim 7 wherein the epoxy resin is used in an amount of from about 30 to about 85 weight percent, based on the weight of the reactants.

20. The process of claim 7 wherein the dihydric phenol is used in an amount of from about 1 to about 60 weight percent, based on the weight of the reactants.

21. The process of claim 7 wherein the acid anhydride is used in an amount of from about 0.1 to about 20 weight percent, based on the weight of the reactants.

22. The process of claim 7 wherein the catalyst is used in an amount of from 0 to about 1 weight percent, based on the weight of the reactants.

23. The process of claim 7 wherein the liquid epoxy resin and the dihydric phenol are first reacted and then the cyclic anhydride is added to the reaction mixture.

24. The process of claim 7 wherein the liquid epoxy resin and the acid anhydride are first reacted and then the dihydric phenol is added to the reaction mixture.

25. The process of claim 7 wherein the dihydric phenol, cyclic anhydride and liquid epoxy resin are reacted in a reactive extruder.

26. The process of claim 7 wherein the reaction is conducted at a temperature of from about 50° C. to about 300° C.

27. The process of claim 7 wherein the epoxy resin is the diglycidyl ether of bisphenol A, the dihydric phenol is bisphenol A, the acid anhydride is phthalic anhydride or maleic anhydride, and the catalyst is ethyl tritolyl phosphonium acetate.

28. A binder composition comprising the CCR resin of claim 1.

29. The binder composition of claim 28 wherein the CCR resin is reacted with a hardener.

30. The binder composition of claim 29 wherein the hardener is an amine-terminated polymer, a carboxy-terminated polymer, a phenol-terminated polymer, a multi-functional amine, carboxylic acid or phenol.

31. The binder composition of claim 28 containing pigments, fillers or flow modifiers.

32. Powder coatings comprising the binder composition of claim 28.

* * * * *